(12) United States Patent
Gouldey et al.

(10) Patent No.: US 12,306,772 B2
(45) Date of Patent: May 20, 2025

(54) ORDERABILITY OF OPERATIONS

(71) Applicant: SiFive, Inc., San Mateo, CA (US)

(72) Inventors: Eric Andrew Gouldey, Fort Collins, CO (US); Michael Klinglesmith, Chambéry (FR); Henry Cook, Berkeley, CA (US); Wesley Waylon Terpstra, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 1 day.

(21) Appl. No.: 18/133,022

(22) Filed: Apr. 11, 2023

(65) Prior Publication Data
US 2024/0184721 A1 Jun. 6, 2024

Related U.S. Application Data

(60) Provisional application No. 63/429,847, filed on Dec. 2, 2022.

(51) Int. Cl.
*G06F 13/16* (2006.01)
(52) U.S. Cl.
CPC ................ *G06F 13/1626* (2013.01)

(58) Field of Classification Search
CPC .................................................. G06F 13/1626
See application file for complete search history.

(56) References Cited

U.S. PATENT DOCUMENTS

| | | | |
|---|---|---|---|
| 10,255,210 B1 * | 4/2019 | Bshara | ............... G06F 13/42 |
| 2022/0318136 A1 * | 10/2022 | Garg | ............... G06F 12/0835 |

* cited by examiner

*Primary Examiner* — David E Martinez
(74) *Attorney, Agent, or Firm* — Kilpatrick Townsend & Stockton LLP

(57) ABSTRACT

A method for managing orders of operations between one or more clients and one or more servers is disclosed. The method includes partitioning addressable regions of logical servers on or within an interconnect link into multiple regions including a first orderable region, and providing logical client an ability to push ordering responsibility within the first orderable region to a server. Over the first orderable region, two request messages for access to memory-mapped sources including two respective operations are transmitted, and the two request messages originate from a same logical client. The ordering responsibility can include a first rule for order of operations between the two request messages.

20 Claims, 8 Drawing Sheets

ORDERABILITY OF OPERATIONS

CROSS REFERENCE TO RELATED APPLICATION

This application claims priority to and the benefit of U.S. Provisional Patent Application Ser. No. 63/429,847, filed on Dec. 2, 2022, the entire disclosure of which is hereby incorporated by reference.

TECHNICAL FIELD

This disclosure relates generally to integrated circuits and, more specifically, to orderability of operations.

BACKGROUND

A System-on-Chip (SoC) is an integrated circuit that includes multiple components connected to one another. The components may include, for example, processor cores, caches, cross bars, memory controllers, and memory-mapped devices. The components may be connected so that data can be transferred between them while adhering to a coherence policy, such as the MSI (modified, shared, invalid), MESI (modified, exclusive, shared, invalid), or MOESI (modified, owned, shared, exclusive, invalid) protocol. For example, the components can include agents that are connected to one another using TileLink, a chip-scale interconnect standard that provides multiple clients with coherent memory mapped access to memory and/or server devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Streaming strongly ordered reads and writes across an un-ordered interconnect requires the client issuing requests to wait for a completion at the server before issuing the next requests. That is, a first transaction (e.g., operation) has to be sent and completed before a second transaction can be sent. This restricts bandwidth and increases latency. Alternatively, requiring the interconnect to enforce order on all transactions can restrict bandwidth of transactions that should be un-ordered. For example, a cache hit would be prevented from going ahead of a cache miss. That is, the use of totally ordered accesses may penalize requests that didn't need to be ordered. This adds latency and increases the amount of time that requests tie up resources in the machine that could be reused to service new requests, etc. Ordering is further complicated when messages that have a defined relative order flow on separate channels (e.g., an AG (get) channel for reads and a AP (put) channel for writes).

These issues can be addressed by providing the ability to express which request (transactions) need to stay in order so that the server receiving a request has information or the ability to decide what the server can do. In this instance, the transactions can be sent at the same time and the server maintains order as instructed or needed. This intelligent ordering minimizes latency between the transactions and saves bandwidth. That is, maintaining the order of two transactions through the fabric allows pipelining requests through the fabric, which boosts bandwidth and decreases latency.

In implementations, mechanisms or rules can be defined which determine order between, for example, same level priority command channels such as the AG and AP. A rule can state that if the AG and AP are accepted on different cycles, then the one that is accepted first is older. If the AG and AP are accepted on a same cycle, then the AP is older. Another mechanism can be to attach an acquire flag or a release flag with the transaction. Attachment of the flag to the transaction enables sending acquire and/or release fences through the interconnect. Another mechanism can require the interconnect to enforce ordering across AG and AP channels "as needed", where "as needed" is a function of address ordering domains including whether an address domain is unordered, weakly ordered, or strongly ordered. For a weakly ordered memory or address region, the interconnect enforces order on transactions that operate on the same address. For a strongly orderable region, the interconnect enforces order on all transactions that operate on the same address, and enforces order (independent of address) if acquire and or release flags are set.

Figure 1:
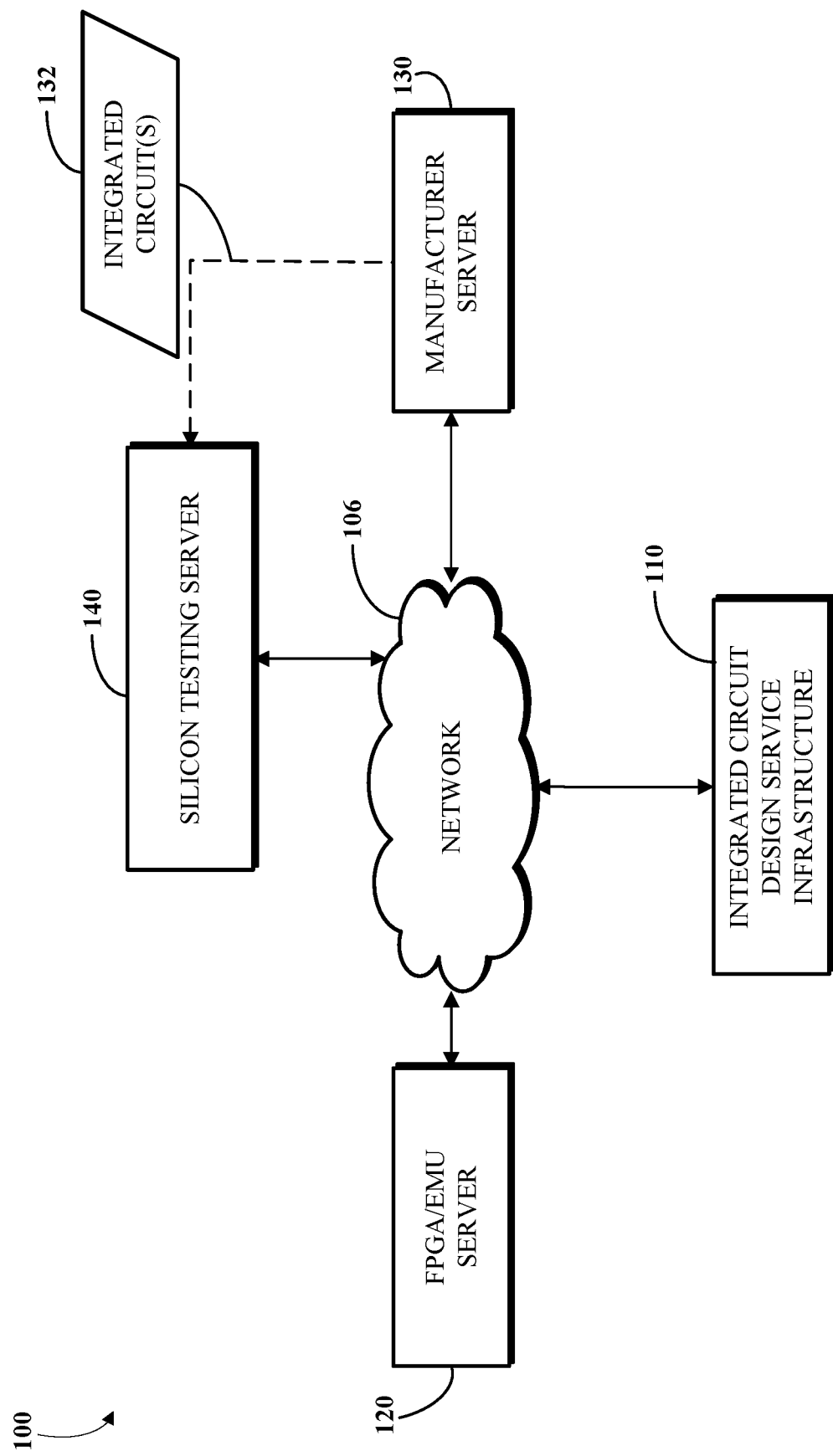
FIG. 1 is a block diagram of an example of a system for facilitating generation and manufacture of integrated circuits.

To describe some implementations in greater detail, reference is first made to examples of hardware and software structures used to implement a system including orderability of operations. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-4.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
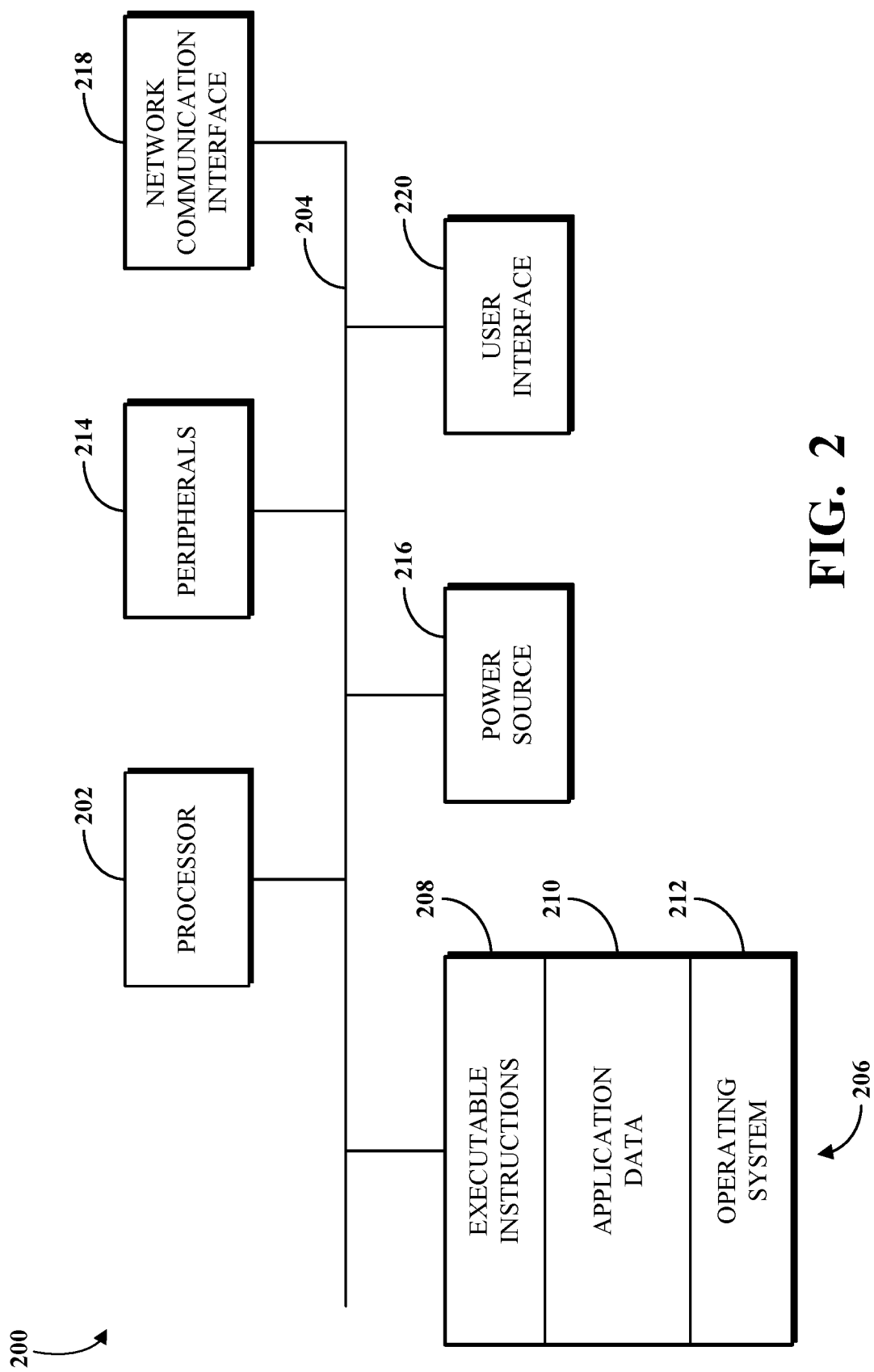
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-4.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
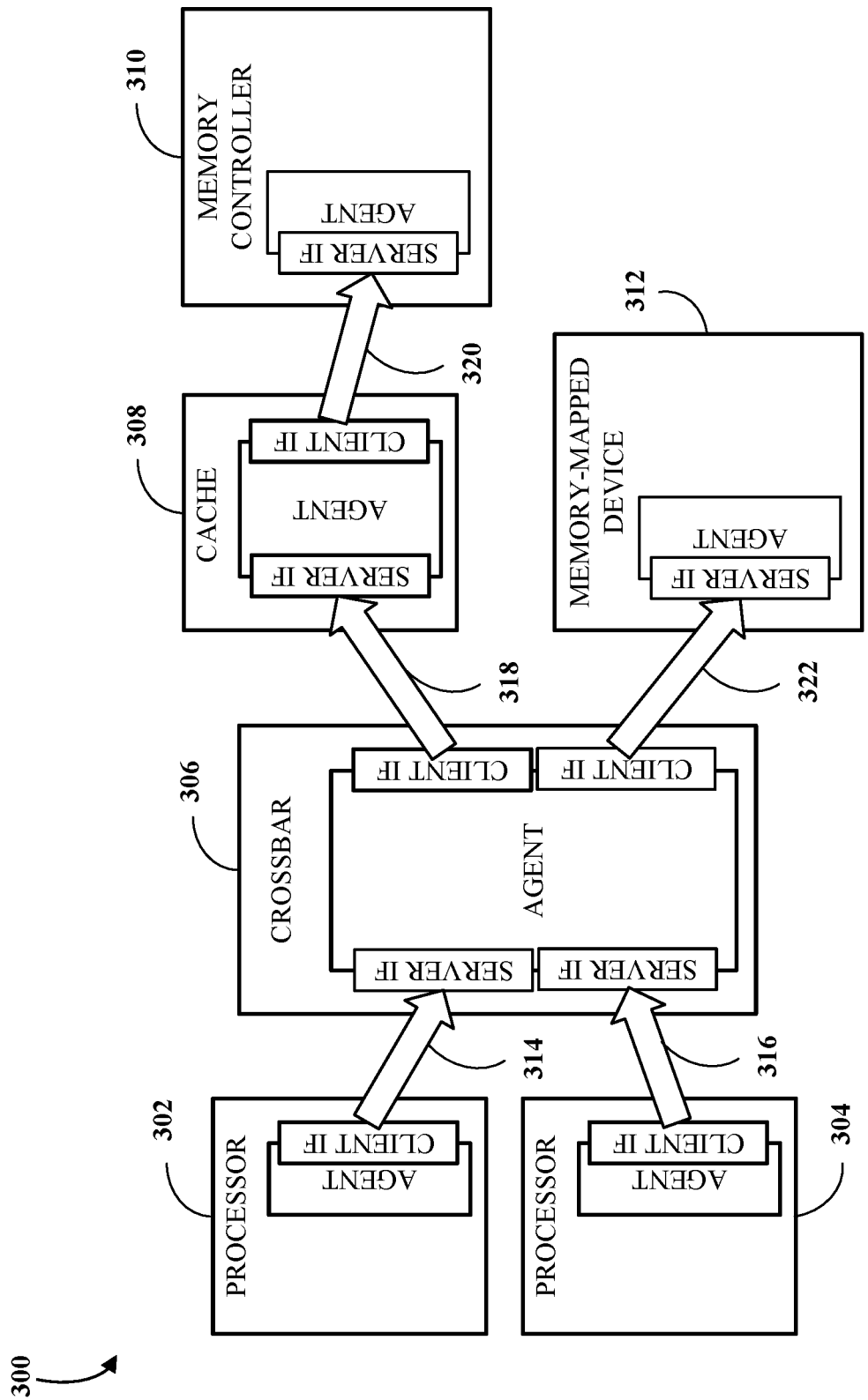
FIG. 3 is a block diagram of an example of a system including components that may facilitate exchange of messages and provide orderability of operations.

FIG. 3 is a block diagram of an example of a system 300 including components that may facilitate exchange of messages and provide orderability of operations. The system 300 could be implemented, for example, by an SoC. The components may include, for example, a first processor core 302 (e.g., which may include a private cache, implementing a data storage such as an SRAM), a second processor core 304 (e.g., which may include another private cache, implementing another data storage such as another SRAM), a cross bar 306, a cache 308 (e.g., a shared cache, implementing another data storage such as another SRAM), a memory controller 310 (e.g., a memory, implementing a data storage such as a DRAM), and a memory-mapped device 312. The components may be connected so that data stored in cache blocks can be transferred between them while adhering to a cache coherence policy, such as one of the MSI, MESI, or MOESI policies. For example, the components can include agents that are connected to one another so that messages involving data can be transferred between them (e.g., sending and receiving) while adhering to the cache coherence policy. For example, the agents may be connected to one another using TileLink (e.g., SiFive TileLink2), a chip-scale interconnect standard that provides multiple clients with coherent memory mapped access to memory and/or server devices. The term TileLink and SiFive TileLink 2 may be used interchangeably for the purpose of describing embodiments in this disclosure.

The agents implemented by the components may implement point-to-point links for communicating the messages to one another. The messages may include, for example, messages associated with requests (e.g., requests for data, evictions of data, and probes for data), responses (e.g., transferring data), and acknowledgements. An agent may implement one or more client interfaces and/or one or more server interfaces for communicating the messages. An agent with a client interface (e.g., a client agent) may request an agent with a server interface (e.g., a server agent) to perform memory operations, or may request permission to transfer and cache copies of data. An agent with a server interface may manage permissions and access to a range of addresses, including performing memory operations on behalf of requests arriving from a client interface. Thus, connected agents may send and receive messages over links to perform operations on shared address space, such as fill operations, probe operations, and evict operations.

For example, in the system 300, the first processor core 302 and the second processor core 304 may each include an agent having a client interface. The cross bar 306 may include an agent having a first server interface, a second server interface, a first client interface, and a second client interface (e.g., the cross bar 306 may be a server and a client, or servent). The client interface of the first processor core 302 may connect to the first server interface of the cross bar 306 by a link 314. The client interface of the second processor core 304 may connect to the second server interface of the cross bar 306 by a link 316. The cache 308 may include an agent having a server interface and a client interface (e.g., the cache 308 may also be a servent). The first client interface of the cross bar 306 may connect to the server interface of the cache 308 by a link 318. The memory controller 310 may include an agent having a server interface. The client interface of the cache 308 may connect to the server interface of the memory controller 310 by a link 320. The memory-mapped device 312 may include an agent having a server interface. The second client interface of the cross bar 306 may connect to the server interface of the memory-mapped device 312 by a link 322. The agents implemented by the first processor core 302, the second processor core 304, the cross bar 306, the cache 308, the memory controller 310, and the memory-mapped device 312, may send and receive messages over their respective links (e.g., the links 314, 316, 318, 320, and 322) to perform operations on shared address space.

Figure 4:
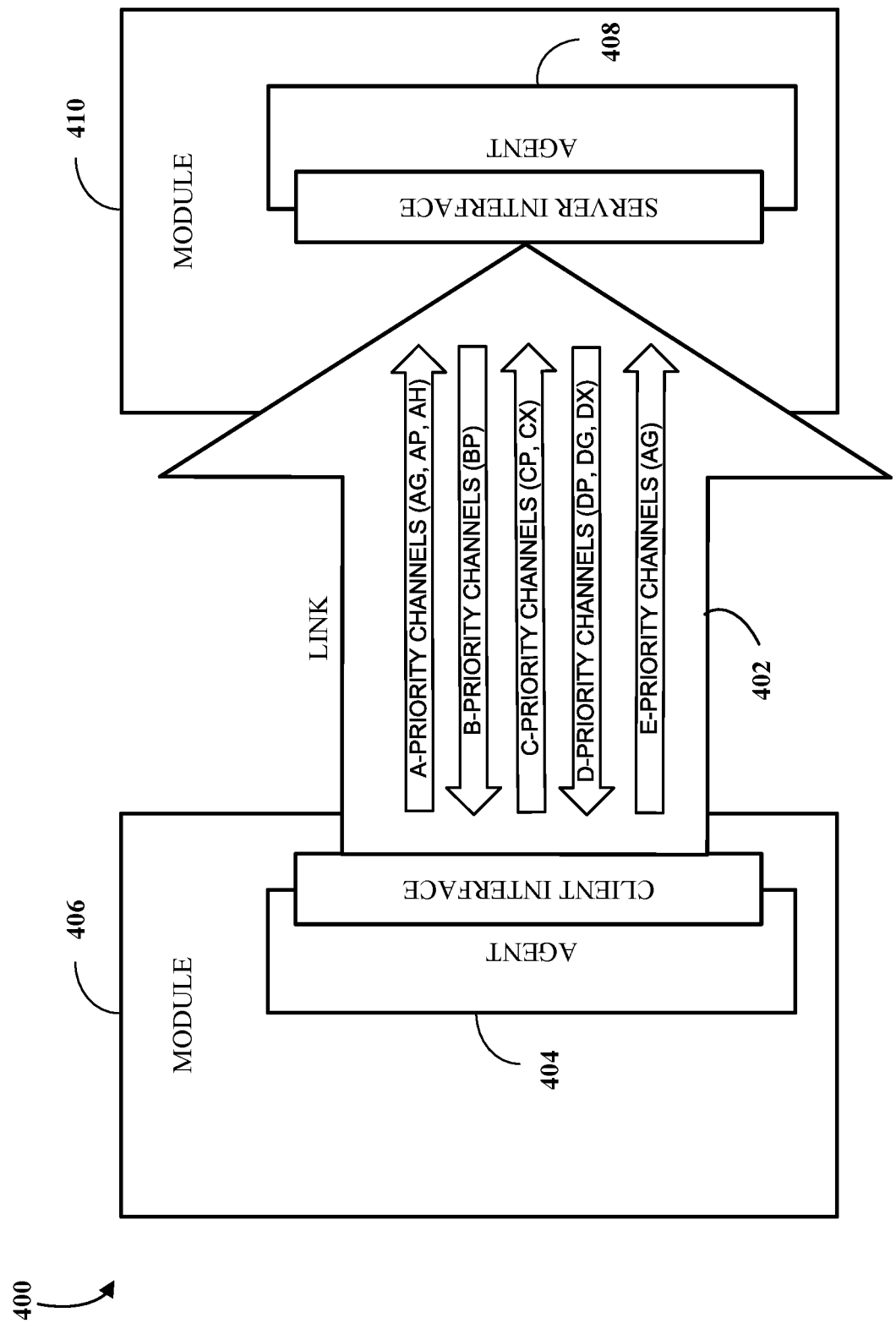
FIG. 4 is a block diagram of an example of a link between agents implemented by components, in which orderability modes or ordering rules may be designed, configured, and or implemented.

FIG. 4 is a block diagram of an example of a link 402 between agents implemented by components in a system 400, in which orderability modes or ordering rules may be designed, configured, and or implemented. Agents may include an agent 404 implemented by a first component 406 and an agent 408 implemented by a second component 410. For example, the link 402 could be one of the links, 314, 316, 318, 320, or 322 shown in FIG. 3.

The agent 404 implemented by the first component 406 may include a client interface (e.g., the agent 404 may be a client agent that is also an inner agent), and the agent 408 implemented by the second component 410 may include a server interface (e.g., the agent 408 may be a server agent that is also an outer agent). For example, the first component 406 could be the first processor core 302, and the second component 410 could be the cross bar 306, the cache 308, or the memory controller 310. The client interface of the agent 404 may connect to the server interface of the agent 408 by the link 402. The connected agents 404 and 408 may send and receive messages to one another over point-to-point channels of the link 402, such as one of the A-priority Channel through E-priority Channel implemented by the link 402. For example, the agents 404 and 408 may send and receive messages to perform operations on a shared address space, such as fill operations, probe operations, and evict operations. An operation may include, for example, a change to an address range's data values, permissions, or location in a memory hierarchy. A message may include a set of control and data values sent over a particular channel (e.g., one of the A-priority Channel through E-priority Channel). The channels may be logically independent from one another for communicating the messages. A priority may be specified among the channels, such as a prioritization in which messages on A-priority Channel have a lowest priority with messages on E-priority Channel having a highest priority (e.g., a prioritization rank of A<B<C<D<E for messages across the channels). The channels may contain transaction control signals and a bus for exchanging data (e.g., a physical bus implemented by wires and having a particular data width, such as 128 bits). The channels may be directional, in that each channel may pass messages either from a client interface to a server interface or from a server interface to a client interface.

For example, the A-priority Channel may enable the agent having the client interface (e.g., the agent 404) to transmit a request to the agent having the server interface (e.g., the agent 408), such as a request that an operation be performed on a specified address range, such as accessing or caching data. The A-priority Channel may include AG, AP, and AH channels. The B-priority Channel may enable the agent having the server interface (e.g., the agent 408) to transmit a request to the agent having the client interface (e.g., the agent 404), such as a request that an operation be performed at an address cached by a client (e.g., the agent 404), such as for accessing or writing back cached data or probing cached data at an address (e.g., a probe). The B-priority Channel may include a BP channel. The C-priority Channel may enable the agent having the client interface (e.g., the agent 404) to transmit to the agent having the server interface (e.g., the agent 408) data, an acknowledgment message in response to the request. The C-priority channel may include CP and CX channels. The D-priority Channel may enable the agent having the server interface (e.g., the agent 408) to transmit a data response or acknowledgement message back to the client (e.g., the agent 404). The D-priority Channel may include DP, DG, and DX channels. The E-priority Channel may enable the agent having the client interface (e.g., the agent 404) to transmit back to the agent having the server interface (e.g., the agent 408) a final acknowledgment of a cache line or block transfer from the requestor (e.g., the agent 404). The E-priority channel may include an AG channel. Below Table 1 gives a summary of the channels.

TABLE 1

| Channel | Priority | Direction | type | Description |
|---|---|---|---|---|
| AG | A | Client→server | command | Client requests that get data or increase permissions |
| AP | A | client→server | command | Client requests that put data or decrease permissions |
| AH | A | client→server | command | Client hints to the server |
| BP | B | server→client | command | Server responses to AP requests and Probe requests |
| CP | C | client→server | command | Client responses to BP messages and InclEvict requests |
| CX | C | client→server | data | Data for channel CP messages |
| DG | D | server→client | command | Server responses to AG and AP messages |
| DP | D | server→client | command | Server responses to AP and CP messages |
| DX | D | server→client | data | Data for channel DG messages |
| EG | E | client→server | command | Client response to DG messages |

When multiple clients share a single server device, it becomes important to reason about the order in which their operations commit. This is of particular concern when there are multiple outstanding operations which are being processed concurrently in the system. Enforcing order between an older operation X and a younger operation Y at the client, by waiting to issue the request message for Y until the acknowledging response message for X has been received, can result in unacceptably low bandwidth for some applications.

To improve utilization, the described interconnect (e.g., link 402) defines orderability modes as a mechanism for a client to push ordering responsibility to a server and thereby reduce the time between committing two operations with an order dependency between them. Moreover, there may be an option of attaching an acquire flag or a release flag with the transaction. The attachment of the flag to the transaction (e.g., operation) may enable sending acquire and/or release fences through the interconnect. The acquire flag may mean that an operation must commit before any younger operation can commit (within a set of operations meeting certain ordering criteria (e.g., same client, same region, etc.)). The release flag may mean that the operation must not commit until older operations have committed (within a set of operations meeting certain ordering criteria (e.g., same client, same region, etc.)) as described in accordance with this disclosure. Moreover, in an example, the interconnect (e.g., link 402) or bus fabric may be programmed to attach flags to the transaction under certain satisfying conditions (e.g., non-overlapping operations) as described in accordance with this disclosure.

The orderability modes provide rules for when the server is allowed to commit (publicly order) the operations of its clients relative to one another. Public commit order provides rules for when the operations of one client become visible to other clients. For example, in memory-like regions, a write may become visible when a subsequent read operation will see a value at least as new as the new value written, and a subsequent write operation will not be overwritten by the value written. For example, committed operation on a cached memory region may be visible to all clients operating on the same link, such as the link 402. For example, committed operation on an uncached memory region or IO region may be visible to all clients in the entire system.

The orderability mode between client operations is established differently for different memory regions. On any given link, such as the link 402, the logical servers (and thus addresses) are partitioned into one or more addressable region, and thus the rules provided by the orderability modes may be different among partitioned addressable regions. For example, the interconnect or the link (e.g., link 402) may be programmed and/or hardcoded to partition into one or more addressable regions by categorizing each region with certain conditions, and depending on which addressable regions two or more operations from same logical client are categorized into, different rules may be applied. For example, in first and second regions, the two or more operations may be subject to the rules of the public commit order, while in a third region, the two or more operations may not be subject to the rules. Further, when two or more operations originate from same logical client, and they are non-overlapping operations (e.g., where operations do not overlap in address), the acquire and/or release flags may be used to express order.

One or more addressable regions may include a first orderable region, a second orderable region, and a third unordered region. The first orderable region and the second orderable region may correspond to a strongly orderable region and a weakly orderable region, respectively, which promise an order for operation X before Y under certain conditions. Example classifications or categorizations of the strongly orderable region and the weakly orderable region are further described below. In strongly orderable region and the weakly orderable region, the interconnect or the bus fabric may provide ability to the logical client to push ordering responsibility to the server, or the interconnect or the bus fabric itself may provide ordering responsibility to the server. Further, option of attaching the acquire flag or the release flag with the transaction can be available in the strongly orderable region. In contrast, within the unordered region, the interconnect or the bus fabric may force the client to manage all dependencies within such unordered region.

In some implementations, strongly orderable regions may provide the ability for a client to push arbitrary dependencies within the region to the server. In some implementations, weakly orderable regions may provide the ability for a client to push same-address dependencies to the server. In some implementations, unordered regions force the client to manage all dependencies.

For example, strongly orderable regions may be addressable regions which promise a public commit order (e.g., rules for when the operations of one client become visible to other clients) for operation X before Y when:
- X and Y operate on the same strongly orderable region, and
- X and Y originate from the same logical client (i.e., X and Y have the same client identifier (included in the client request messages to route response messages to the client which issued a request)), and
- X and Y both use A-priority request messages, and
- neither X nor Y is an Evict or Hint operation, and
- an X message was sent at A-priority (e.g., through A-priority channel) before a Y message was sent at A-priority, and
- either
  - X and Y overlap in address and have matching cacheable attributes, or
  - X has the acquire flag, or
  - Y has the release flag.

For example, weakly orderable regions may be addressable regions which promise a public commit order for operation X before Y when:
- X and Y operate on the same weakly ordered region, and
- X and Y originate from the same logical client (i.e., X and Y have the same client identifier), and
- X and Y both use A-priority request messages, and
- neither X nor Y is an Evict or Hint operation, and
- an X message was sent at A-priority before a Y message was sent at A-priority, and
- X and Y overlap in address and have matching cacheable attributes For example, unordered regions may promise no public commit order between concurrent operations. A client sending operations to the unordered region must assume nothing about the order in which its operations will be committed until it receives the operation's acknowledging response message communicating public commit order (which may be on either a B- or D-priority channel).

Simply accessing a strongly orderable region with the same logical client does not guarantee anything about operations which do not overlap. To express order between non-overlapping operations, the acquire and/or release flags may be used. Further, orderability modes do not establish order between different clients in the system. Clients can only observe response messages communicating public commit order to infer such a guarantee.

Figure 5:
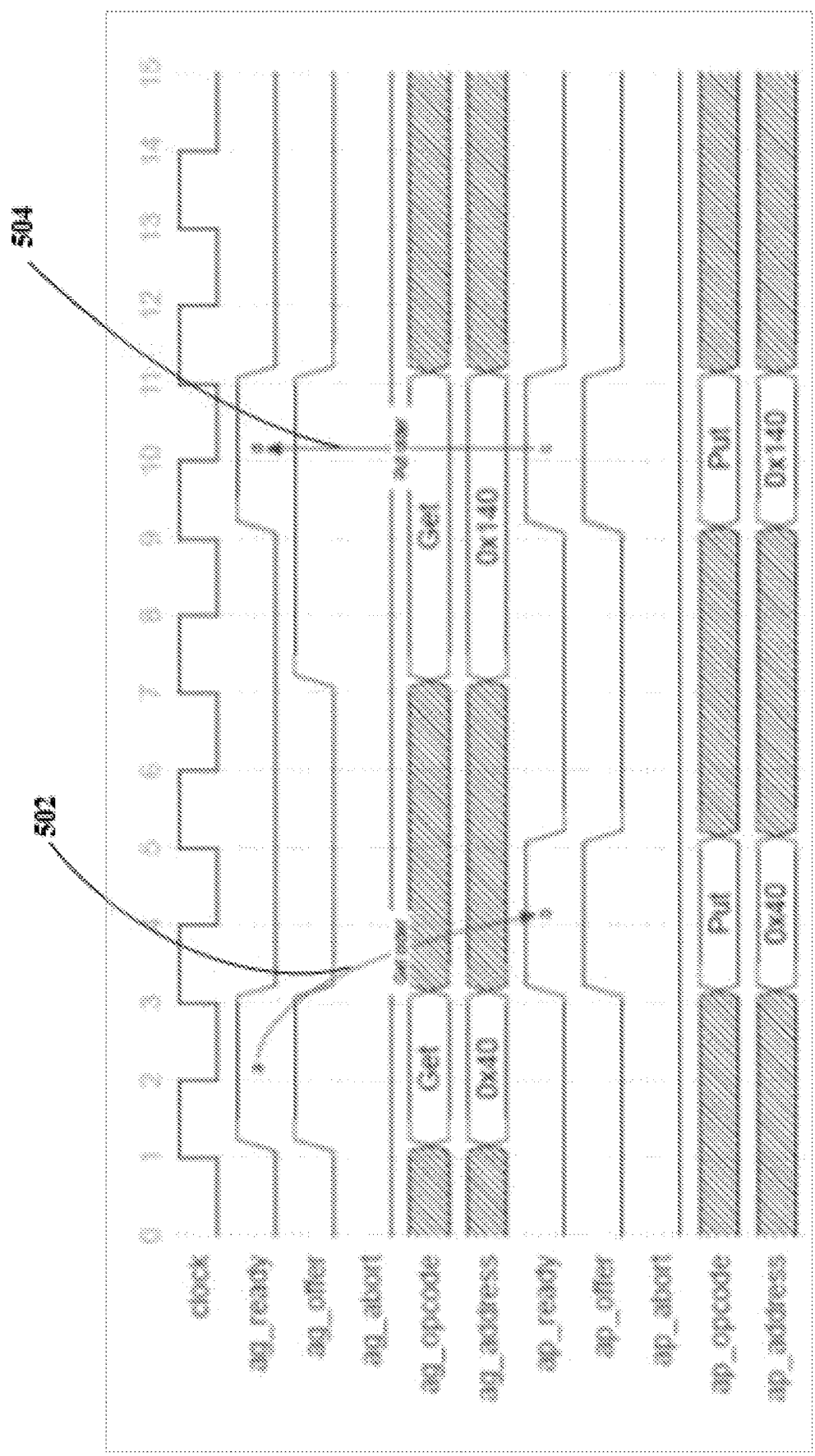
FIG. 5 is an example illustration of orderability mode operation.

Servers can infer order from accepted beats, where a unit of flow control is called a beat, which is the amount of information transferred in one clock. Simply presenting a beat does not establish any orderability mode. A client may choose to present beats in an order that does not match the accepted beat order. For example, if a client presents a Get operation that is not accepted by the server on cycle N, it may choose to continue to present that Get operation on cycle N+1, and also present a new overlapping Put operation on cycle N+1. If the server had accepted the Get operation on cycle N and the Put operation on cycle N+1, then the Get operation would be ordered before the Put operation (assuming all other orderability mode conditions were met). However, if the server accepts the Put and Get operations on the same cycle, the Put operation is ordered before the Get operation. FIG. 5 illustrates a first example 502 where a Get (e.g., read) operation is older than an overlapping Put (e.g. write) operation, and a second example 504 where a Get operation is younger than an overlapping Put operation.

In other words, the orderability modes set the following rules:
- When operation X is promised order before overlapping operation Y:
  - If X is a Put and Y is a Get, the client is guaranteed that Y sees the updated value.
  - If X is a Get and Y is a Put, the client is guaranteed that X does not see the updated value.
  - If X is a Put and Y is a Put, the client is guaranteed that Y writes over X.

FIG. 5 is an illustration of orderability mode among Get and Put operations. The first example 502 illustrates an order of operations between a Get operation (with address size of 0x40) and a Put operation (with address size of 0x40). In this example, the Put operation and the Get operation are accepted by the server on different cycles (e.g., cycle N for Get operation and cycle N+1 for Put operation). In this instance of non-overlapping operations between the Get and Put operations, based on rules of the orderability modes, the Get operation is older and ordered before the Put operation.

On the other hand, the second example 504 illustrates an order of overlapping (e.g., operations which addresses overlap) operations between a Get operation (with address size of 0x140) and a Put operation (with address size of 0x140). Based on rules of the orderability modes described above, if the server accepts the Put and Get operations on the same cycle, in this second example 504, the Put operation is ordered before the Get operation.

Another mechanism in enforcing such rules, either with or without operability modes (which includes partitioning rules and rules for Put and Get operations described above), can be to attach an acquire flag or a release flag with the transaction (e.g., operation, request messages for access (e.g., read, write) to memory-mapped sources). Attachment of the flag to the transaction may enable sending acquire and/or release fences through the interconnect. These flags may provide the rules on how non-overlapping operations in a strongly orderable region can be reordered by the server before public commit. For example, the acquire flag may mean that an operation must commit before any younger operation can commit and the release flag may mean that the operation must not commit until older operations have committed.

For example, without partitioning of regions from the operability modes, acquire and/or release flags may be attached to the transaction or operation to provide the rules on how non-overlapping operations may be ordered by the server.

For example, with partitioning rules implemented from the operability modes, acquire and/or release flags may be attached to the non-overlapping Get and Put operations or transactions within the strongly orderable region.

In another example, designs or programming of an interconnect (e.g., TileLink, link 402), or a system including the interconnect, clients, and/or a server, may implement an assertion error if the server receives a message with acquire or release flag set to region that is not strongly orderable. In other words, it may not be allowable (e.g., illegal) for the client to operate with either the acquire or release flags on an address that is not a member of a strongly orderable region.

Further, tightly coupled clients and servers may agree to an orderability mode for even more operations. For example, a strongly orderable region may waive the same client identifier requirement.

Overall, the interconnect (e.g., link 402) may enforce order on all transactions that operate on the same address, and enforces order (independent of address) if acquire and/or release flags are set.

Below Table 2 gives an example of operability modes:

TABLE 2

| Client Type | To IO region? | Orderability Mode | Reasoning |
|---|---|---|---|
| Core with no L1 cache | — | Strongly orderable | A simple core client may wish to push all ordering enforcement to the server. |
| | — | Weakly orderable | A client may wish to pipeline all program order operations except fences |
| Core with L1 + single-slice next level cache | n | Strongly orderable | A core with an outer cache that can maintain order across addresses may choose to expose Get and Put operations and their program ordering constraints to the outer cache rather than enforcing them at the client |
| | y | Strongly orderable | IO accesses may be strongly ordered in RISC-V cores. |
| Core with L1 + multi-slice next level cache | n | Weakly orderable | A core with an outer cache that cannot maintain order across addresses may still choose to pipeline overlapping-address Get and Put operations to the outer cache rather than enforcing their same-address order at the client. |
| | n | unordered | A core with a private outer cache that cannot maintain order across addresses may instead choose to enforce same-address ordering rules locally, without depending on private ordering. |
| | y | Strongly orderable | IO accesses may be strongly ordered in RISC-V cores. |
| last-level cache to memory controller | n | unordered | Memory controllers are typically unordered, allowing all concurrent operations to be reordered, so all ordering requirements must be enforced by the cache. |
| Other Protocol bridge | — | Strongly orderable with multiple logical clients | R and W channels are unordered with respect to each other, so these could be represented with 2 logical clients. The protocol bridge could additionally map different Other Protocol IDs to different logical clients if desired. |

Further, following paragraph gives an example of how the interconnect (e.g., link 402) may set up the rules of Acquire/Release-Flag Ordering.

To communicate order restrictions from client to server in a strongly orderable region, operations may carry the optional acquire and release flags. These flags provide the rules on how non-overlapping operations in a strongly orderable region may be reordered by the server before public commit. Even without these flags, overlapping operations in a strongly orderable region must not be publicly reordered. To support bridges to protocols that require sequential response order, TileLink (e.g., link 402) defines a mode of operation where:

1. the client must only target a particular strongly orderable region with requests that have both acquire and release flags set; and
2. the server must deliver the D-priority response messages for this client's requests in commit order.

Moreover, in an example, the AG, AP and DG, DP Ordering Rules of the orderability mode may be described as follows.

The orderability mode and Acquire/Release ordering descriptions above define requirements that require in some cases that a message on one channel not be allowed to pass another message. When a message Y is not allowed to pass a message X, we say message X is privately ordered (i.e., operability mode used) ahead of message Y. The following rules guarantee the architectural ordering requirements are met. These rules apply to the both the AG, AP channels and the DG, DP channels.

On a link, an agent may only assert both xP_valid and xG_valid in the same cycle if either the xP and xG messages are unordered or the xP message is privately/sequentially ordered ahead of the xG message.

When xP_valid and xG_valid are both asserted, an agent may only assert xG_ready and deassert xP_ready in the same cycle if the xP and xG messages are unordered.

When xP_offer and xG_offer are both asserted, and xP_abort is asserted, xG_abort must also be asserted, unless the xP and xG messages are unordered.

The implication of the above rules is that if a Put and a Get are presented together, than either they are unordered, or the Put is privately ordered ahead of the Get.

Figure 6:
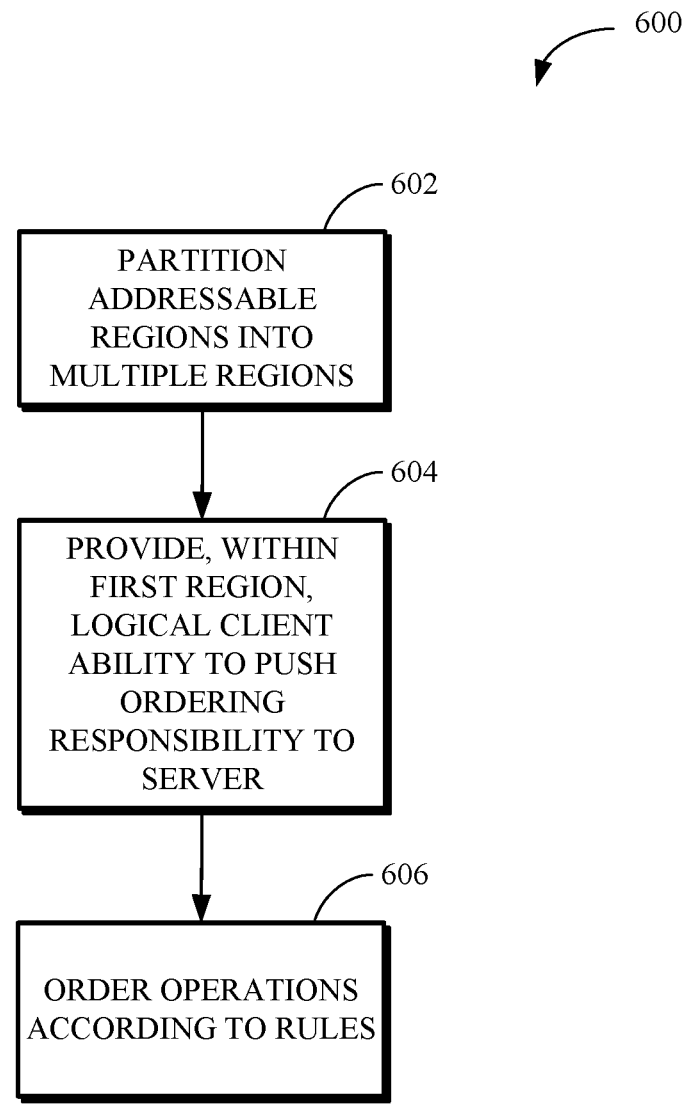
FIG. 6 is a flowchart diagram of a method for ordering multiple operations between one or more clients and one or more servers through an interconnect.

FIG. 6 is a flowchart diagram of a method 600 for ordering multiple operations between one or more clients and one or more servers through an interconnect, such as the link 402 (e.g., TileLink), or bus fabric. The method 600 may utilize the ordering rules, customized rules, or rules of the orderability modes as described above with respect to FIGS. 4 and 5, and Table 2. For example, the rules may include rules based on the orderability mode, public commit order, customized rules, rules based on acquire/release flags, etc. The rules may be programmed and/or hardcoded into a SoC, interconnect, and/or a circuit that includes or is associated with the interconnect.

At 602, the method 600 partitions one or more logical servers (and thus addresses) on or within an interconnect or link into multiple addressable regions. In some implementations, the multiple regions may include a first region, a second region, and a third region. For example, the interconnect or the link (e.g., link 402) may be programmed and/or hardcoded to partition logical servers on or within the link into one or more addressable regions by categorizing each region with certain conditions. For example, regions may be categorized based on the ordering rules or the orderability modes as described above with respect to FIGS. 4 and 5, and Table 2. For example, different rules may be applied to different regions depending on certain conditions. For example, different regions may be configured with or subject to certain rules (e.g., rules based on the orderability mode, public commit order, customized rules, rules based on acquire/release flags, etc.) under certain conditions through programming and/or hardcoding of a SoC, interconnect, and/or a circuit that includes or is associated with the interconnect.

In some implementations, the first region may be either the strongly orderable region or the weakly orderable region as described above with respect to FIGS. 4 and 5 and Table 2. In some implementations, the first region may be the strongly orderable region, the second region may be the weakly orderable region, and the third region may be the unordered region, as described above with respect to FIGS. 4 and 5, and Table 2.

Even though implementations and examples are shown with only three regions, the logical servers on or within the interconnect may be partitioned into two addressable regions or more than three addressable regions. Further, orderability mode as described above with respect to FIGS. 4 and 5, and Table 2 may be applied or may be customized so that they may be appropriately implemented into partitioned regions.

At 604, the method 600 may provide, within the first region, the logical client ability to push ordering responsibility to a server. In some implementations, the SoC, the interconnect and/or the circuit that includes or is associated with the interconnect may be designed, programmed, and/or hardcoded to provide ability to the logical client to push ordering responsibility to the server, or the interconnect or the bus fabric itself may provide ordering responsibility to the server. For example, the first region may provide the ability for a client to push same address dependencies within the region to the server. In another example, the first region may provide the ability for a client to push arbitrary dependencies within the region to the server. For example, providing the ability to push ordering responsibility to the server may include providing an orderability rule (e.g., orderability modes, ordering rules, and/or customized rules) to the server.

By doing (e.g., pushing ordering responsibility to the server) so, time between committing two or more operations (e.g., transactions, read and/or write operations, request messages for access (e.g., read, write) to memory-mapped sources, etc.) with an order dependency between them can be reduced. For example, process including partitioning the regions of the logical server on or within the interconnect based on the orderability mode (e.g., as described with respect to FIGS. 4 and 5, and Table 2), configuring the orderability mode to the interconnect, partitioned regions, and/or a circuit including such interconnect, and pushing the ordering responsibility to the server may enhance efficiency of operations. For example, between an older operation X and a younger operation Y, the client does not have to wait to issue the request message for Y until the acknowledging response message for X has been received, which can result in unacceptably low bandwidth for some applications.

In some implementations, there may be an option of attaching an acquire flag or a release flag with the transaction. The attachment of the flag to the transaction may enable sending acquire and/or release fences through the interconnect. In an example, the interconnect (e.g., link 402) or bus fabric may be programmed attach flags to the transaction under certain satisfying conditions (e.g., non-overlapping operations). In an example, SoC, interconnect, and/or a circuit that includes or is associated with the interconnect may be designed, programmed and/or hardcoded to attach flags to the transaction under certain satisfying conditions (e.g., non-overlapping operations).

At 606, the method 600 orders two or more operations based on the orderability modes (as described above with respect to FIGS. 4 and 5, and Table 2), ordering rules, or customized rules. For example, different regions may be configured with or subject to certain rules (e.g., rules based on the orderability mode, public commit order, customized rules, rules based on acquire/release flags, etc.) under certain conditions through designing, programming and/or hardcoding of a SoC, interconnect, and/or a circuit that includes or is associated with the interconnect. For example, the rule may determine an order between same level priority command channels such as the AG and AP, which may state that if the AG and AP are accepted on different cycles, then the one that is accepted first is older. For example, the rule may state that if the AG and AP are accepted on a same cycle, then the AP is older. For example, attached flags may provide the rules on how non-overlapping operations in a strongly orderable region may be reordered by the server before public commit. For example, the rule may be from the orderability mode.

Figure 7:
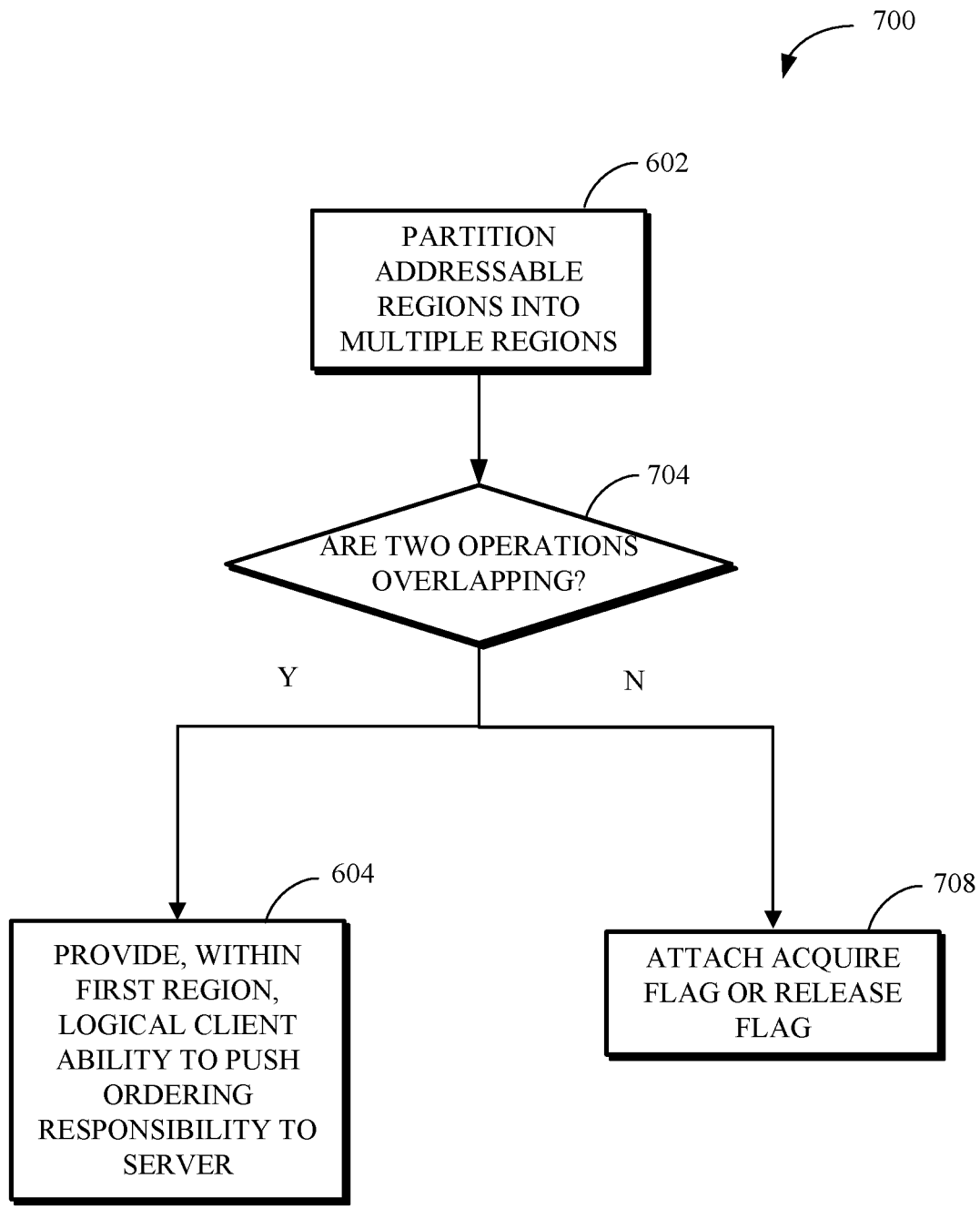
FIG. 7 is a flowchart diagram of a method for ordering overlapping and non-overlapping operations between one or more clients and one or more servers through an interconnect.

FIG. 7 is a flowchart diagram of a method 700 for ordering overlapping and non-overlapping operations between one or more clients and one or more servers through an interconnect, such as the link 402 (e.g., TileLink), or bus fabric. The method 700 may utilize the ordering rules, customized rules, or rules of the orderability modes as described above with respect to FIGS. 4 and 5, and Table 2. For example, the rules may include rules based on the orderability mode, public commit order, customized rules, rules based on acquire/release flags, etc. The rules may be programmed and/or hardcoded into a SoC, interconnect, and/or a circuit that includes or is associated with the interconnect. The method 700 may be combined with the method 600 in feasible manner in accordance with implementations of this disclosure.

At 602, the method 600 partitions logical servers (and thus addresses) on or within an interconnect or link into multiple addressable regions. As the technique used at step 602 in the method 700 is used in the same manner as described above with respect to the method 600, the technique is not repeatedly mentioned here.

At 704, the method 700 determines whether two operations overlap (e.g., in address, as illustrated with respect to FIG. 5). For example, SoC, interconnect, and/or a circuit that includes or is associated with the interconnect may be designed, programmed and/or hardcoded to determine whether the two operations overlap. In some implementations, optionally, overlapping operations may require the operation to have matching cacheable attributes in addition to overlapping address.

If yes, the method 700 proceeds to step 604. At 604, the method 600 provides, within the first region, logical client on or within the interconnect the ability to push ordering responsibility to server. As the technique used at step 604 in the method 700 is used in the same manner as described above with respect to the method 600, the technique is not repeatedly mentioned here.

If no, the method 700 proceeds to step 708. At 708, the method 700 attaches acquire and/or release flag to the operation (e.g., transaction, transaction including request messages for access (e.g., read, write) to memory-mapped sources, etc.). The attachment of the flag to the transaction may enable sending acquire and/or release fences through the interconnect. In an example, these flags provide the rules on how non-overlapping operations may be reordered by the server before public commit. In an example, the interconnect (e.g., link 402) or bus fabric may be programmed attach flags to the transaction under certain satisfying conditions (e.g., non-overlapping operations). In an example, the interconnect (e.g., link 402) or bus fabric may have fields which may be programmed and/or hardcoded to attach flags to the operation (e.g., transaction) under certain satisfying conditions (e.g., non-overlapping operations). In an example, the acquire and/or release flag may be attached to a request message for access to memory-mapped resources.

Even though not depicted in FIG. 7, the method 700 may order two or more operations after step 604 and 708 based on the orderability modes (as described above with respect to FIGS. 4 and 5, and Table 2), ordering rules, or customized rules.

Figure 8:
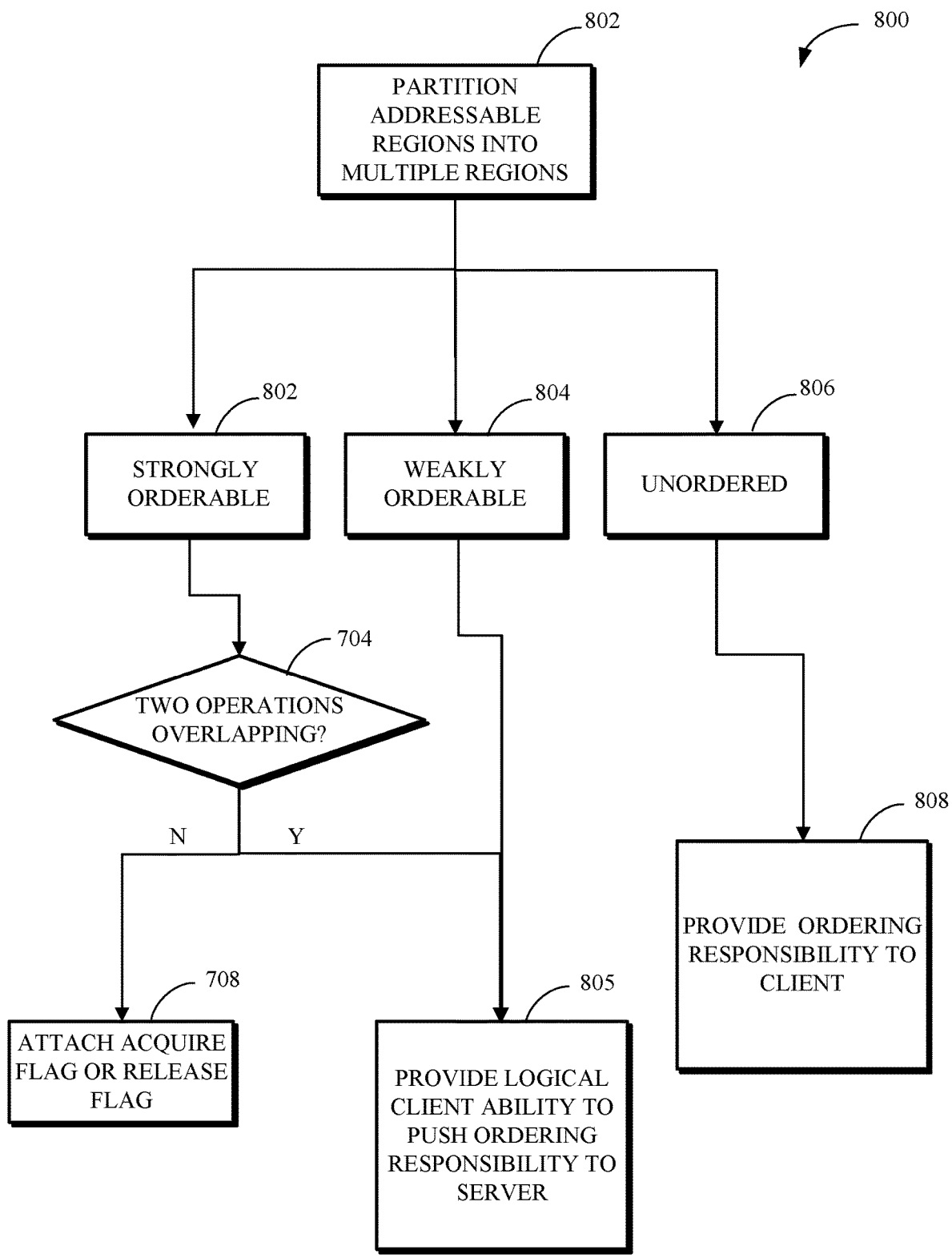
FIG. 8 is a flowchart diagram of an example implementation of a method for ordering multiple operations between one or more clients and one or more servers through an interconnect.

FIG. 8 is a flowchart diagram of an example implementation 800 of a method for ordering multiple operations between one or more clients and one or more servers through an interconnect, such as the link 402 (e.g., TileLink), or bus fabric. The example implementation 800 may utilize the ordering rules, customized rules, and/or rules of the orderability modes as described above with respect to FIGS. 4 and 5, and Table 2. For example, the rules may include rules based on the orderability mode, public commit order, customized rules, rules based on acquire/release flags, etc. The example implementation 800 may be combined with the method 600 and/or the method 700 in feasible manner in accordance with implementations of this disclosure.

At 802, the example implementation 800 partitions logical servers (and thus addresses) on an interconnect or link into three addressable regions. For example, the interconnect or the link (e.g., link 402) may be programmed and/or hardcoded to partition logical servers on or within the link into one or more addressable regions by categorizing each region with certain conditions. For example, regions may be categorized based on the ordering rules or the orderability modes as described above with respect to FIGS. 4 and 5, and Table 2. For example, different rules may be applied to different regions depending on certain conditions. For example, different regions may be configured with or subject to certain rules (e.g., rules based on the orderability mode, public commit order, customized rules, rules based on acquire/release flags, etc.) under certain conditions through programming and/or hardcoding of a SoC, interconnect, and/or a circuit that includes or is associated with the interconnect.

The example implementation 800 partitions addressable regions into three regions including a strongly orderable region 802, a weakly orderable region 804, and an unordered region 806.

The strongly orderable region 802 may be any strongly orderable region specified above with respect to FIGS. 4 and 5, and Table 2. In an example, the strongly orderable region 802 may be addressable regions which promise a public commit order for operation X before Y when: 1) X and Y operate on the same strongly orderable region; 2) X and Y originate from the same logical client (i.e., X and Y have the same client identifier (included in the client request messages to route response messages to the client which issued a request)); and 3) X and Y both use A-priority request messages; 4) neither X nor Y is an Evict or Hint operation; 5) an X message was sent at A-priority (e.g., through A-priority channel) before a Y message was sent at A-priority; and 6) either X and Y overlap in address and have matching cacheable attributes, or X has the acquire flag, or Y has the release flag.

At 704, within the strongly orderable region 802, the example implementation 800 determines whether two operations overlap (e.g., in address, as illustrated with respect to FIG. 5). For example, the SoC, the interconnect, and/or the circuit that includes or is associated with the interconnect may be programmed and/or hardcoded to determine whether the two operations overlap. In some implementations, optionally, overlapping operations may require the operation to have matching cacheable attributes in addition to overlapping address.

If yes, the example implementation 800 proceeds to step 805. At 805, with respect to the strongly orderable region 802, the method 600 provides logical client on or within the interconnect the ability to push ordering responsibility to server. As the technique used at step 805 is similar to the technique used in step 604 for the method 700 and the method 800, the technique is not repeatedly mentioned here.

If no, the example implementation 800 proceeds to step 708. At 708, the example implementation 800 attaches acquire and/or release flag to the operation or transaction. As the technique at step 708 is used in the example implementation 800 in the similar manner compared to the method 700, the technique is not repeatedly mentioned here.

With regards to the weakly orderable region 804, the weakly orderable region 804 may be any weakly orderable region specified above with respect to FIGS. 4 and 5, and Table 2. For example, the weakly orderable region 804 may be addressable regions which promise the public commit order for operation X before Y when: 1) X and Y operate on the same weakly ordered region; 2) X and Y originate from the same logical client (i.e., X and Y have the same client identifier); 3) X and Y both use A-priority request messages; 4) neither X nor Y is an Evict or Hint operation; 5) an X message was sent at A-priority before a Y message was sent at A-priority; and 6) X and Y overlap in address and have matching cacheable attributes.

At 805, with respect to the weakly orderable region 804, the example implementation 800 provides logical client ability to push ordering responsibility to the server. Again, as the technique used at step 805 is similar to the technique used in step 604 for the method 700 and the method 800, the technique is not repeatedly mentioned here.

With regards to the unordered region 806, the unordered region 806 may be any unordered region specified above with respect to FIGS. 4 and 5, and Table 2. For example, the unordered region 806 may promise no public commit order between concurrent operations. A client sending operations to the unordered region must assume nothing about the order in which its operations will be committed until it receives the operation's acknowledging response message communicating public commit order (which may be on either a B- or D-priority channel).

At 808, with regards to the unordered region 806, the example implementation 800 provides ordering responsibility to the client.

Accordingly, primary concern is addressed by the described system and/or the interconnect that partitions addressable region of an interconnect or logical server on or within an interconnect, into multiple addressable regions, and defining ordering rules and/or orderability modes as a mechanism for a client to push ordering responsibility to a server. This would reduce the time between committing two operations with an order dependency between them. Moreover, the option of attaching an acquire flag or a release flag with the transaction (e.g., operation) can be used in accordance with implementations of disclosure. The attachment of the flag to the transaction may enable sending acquire and/or release fences through the interconnect.

Described herein are implementations with respect to the orderability of operations. The implementations may include methods and processors, integrated circuits, and components therein to perform the methods.

In implementations, a method for managing orders of operations between one or more clients and one or more servers through an interconnect link includes partitioning addressable regions of one or more logical servers on or within an interconnect link into multiple regions including at least a first orderable region, where two request messages for access to memory-mapped sources including two respective operations are transmitted over the first orderable region; and the two request messages originate from a same logical client; and providing the logical client an ability to push ordering responsibility within the first orderable region to a server, wherein the ordering responsibility includes a first rule for order of operations between the two request messages.

In implementations, the first rule includes ordering the order of operations included in the two request messages by ordering the read operation before the write operation when the server accepts the read operation and the write operation on a same cycle. In implementations, the method further includes attaching, when two operations are non-overlapping operations, an acquire flag to a first request message of two request messages or a release flag to a second request message of two request messages, wherein the acquire flag and the release flag provide a second rule for the order of operations between the two request messages. In implementations, the second rule includes, when the acquire flag or the release flag is attached, ordering the order of operations between the two request messages by ordering an operation of the read operation and the write operation based on an accepted sequence by the server. In implementations, the method further includes ordering the order of operations between the two request messages according to the first rule and the second rule. In implementations, the multiple regions further comprise a second orderable region, where a third request message for access to memory-mapped sources and a fourth request message for access to memory-mapped sources including two respective operations are transmitted over the second orderable region; the third request message and the fourth request messages originate from a same second logical client; and the two respective operations of the third request message and the fourth request message are overlapping operations. In implementations, the method further includes providing the second logical client an ability to push the ordering responsibility within the second orderable region to the server, wherein the ordering responsibility includes the first rule for order of operations between the third request message and the fourth request message. In implementations, the multiple regions further comprise a third unordered region, wherein a third logical client enforces an order between operations included in request messages for access to memory-mapped sources within the third unordered region. In implementations, the method further includes providing an assertion error when the server receives a request message with the acquire flag or the release flag from the second orderable region or the third unordered region.

In implementations, a method for managing orders of operations between one or more clients and one or more servers through an interconnect link includes partitioning addressable regions of one or more logical servers on or within an interconnect link into multiple regions including at least a strongly ordered region, where: two request messages including two respective operations are transmitted over the strongly ordered region, each of the two respective operations is a write operation or a read operation; and the two request messages originate from a same logical client; providing, when two operations are overlapping operations, the logical client an ordering enforcement ability within the strongly ordered region to a server; and attaching, when two operations are non-overlapping operations, an acquire flag or a release flag to one or more of two request messages.

In implementations, the acquire flag and the release flag provide a rule for the order of operations between the two request messages. In implementations, the rule includes, when the acquire flag or the release flag are attached, ordering an order of operations between the two request messages by ordering a read operation and a write operation based on an accepted sequence by the server.

In implementations, an integrated circuit for executing instructions includes an interconnect configured to partition addressable regions of one or more logical servers on or within the interconnect link into multiple regions including at least a first orderable region, where: two request messages for access to memory-mapped sources including two respective operations are transmitted over the first orderable region; and the two request messages originate from a same logical client; and provide the logical client an ability to push ordering responsibility within the first orderable region to a server, wherein the ordering responsibility includes a first rule for order of operations between the two request messages.

In implementations, the first rule includes ordering the order of operations included in the two request messages by ordering the read operation before the write operation when the server accepts the read operation and the write operation on a same cycle. In implementations, the interconnect is further configured to attach, when two operations are non-overlapping operations, an acquire flag to a first request message of two request messages or a release flag to a second request message of two request messages, wherein the acquire flag and the release flag provide a second rule for the order of operations between the two request messages. In implementations, the second rule includes, when the acquire flag or the release flag is attached, ordering the order of operations between the two request messages by ordering an operation of the read operation and the write operation based on an accepted sequence by the server. In implementations, the interconnect is further configured to order the order of operations between the two request messages according to the first rule and the second rule. In implementations, the multiple regions further includes a second orderable region, where: a third request message for access to memory-mapped sources and a fourth request message for access to memory-mapped sources including two respective operations are transmitted over the second orderable region; the third request message and the fourth request messages originate from a same second logical client; and the two respective operations of the third request message and the fourth request message are overlapping operations; and a third orderable region, wherein a third logical client enforces an order between operations included in request messages for access to memory-mapped sources within the third unordered region.

In implementations, a non-transitory computer readable medium comprising a circuit representation that, when processed by a computer, is used to program or manufacture an integrated circuit including an interconnect configured to: partition addressable regions of one or more logical servers on or within an interconnect link into multiple regions including at least a strongly ordered region, where: two request messages including two respective operations are transmitted over the strongly ordered region, each of the two respective operations is a write operation or a read operation; and the two request messages originate from a same logical client; provide, when two operations are overlapping operations, the logical client an ordering enforcement ability within the strongly ordered region to a server; and attach, when two operations are non-overlapping operations, an acquire flag or a release flag to one or more of the two request messages.

In implementations, the multiple regions further include an unordered region, wherein a respective logical client enforces an order between operations included in request messages for access to memory-mapped sources within the unordered region.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method for managing orders of operations between one or more clients and one or more servers through an interconnect link, comprising:
    partitioning addressable regions of one or more logical servers on or within an interconnect link into multiple regions including at least a first orderable region, wherein:
       two request messages for access to memory-mapped sources including two respective operations are transmitted over the first orderable region; and
       the two request messages originate from a logical client;
    providing the logical client an ability to push ordering responsibility within the first orderable region to a server, wherein the ordering responsibility includes a first rule for order of operations between the two request messages; and
    attaching, when the two operations are non-overlapping operations, an acquire flag to a first request message of the two request messages or a release flag to a second request message of the two request messages, wherein the acquire flag and the release flag provide a second rule for the order of operations between the two request messages.

2. The method of claim 1, wherein the first rule includes ordering the order of operations included in the two request messages by ordering a read operation before a write operation when the server accepts the read operation and the write operation on a same cycle.

3. The method of claim 2, wherein the second rule includes, when the acquire flag or the release flag is attached, ordering the order of operations between the two request messages by ordering an operation of the read operation and the write operation based on an accepted sequence by the server.

4. The method of claim 1, further comprising, ordering the order of operations between the two request messages according to the first rule and the second rule.

5. The method of claim 1, wherein the two operations are two first operations, and the multiple regions further comprise a second orderable region, wherein:
    a third request message for access to memory-mapped sources and a fourth request message for access to memory-mapped sources including two respective second operations are transmitted over the second orderable region;
    the third request message and the fourth request messages originate from a second logical client; and
    the two respective second operations of the third request message and the fourth request message are overlapping operations.

6. The method of claim 5, further comprising:
    providing the second logical client an ability to push the ordering responsibility within the second orderable region to the server, wherein the ordering responsibility includes the first rule for order of operations between the third request message and the fourth request message.

7. The method of claim 6, wherein the multiple regions further comprise a third unordered region, wherein a third logical client enforces an order between operations included in request messages for access to memory-mapped sources within the third unordered region.

8. The method of claim 7, further comprising:
    providing an assertion error when the server receives a request message with the acquire flag or the release flag from the second orderable region or the third unordered region.

9. An integrated circuit for executing instructions comprising:
    an interconnect configured to:
    partition addressable regions of one or more logical servers on or within the interconnect link into multiple regions including at least a first orderable region, wherein:
       two request messages for access to memory-mapped sources including two respective operations are transmitted over the first orderable region; and
       the two request messages originate from a logical client;
    provide the logical client an ability to push ordering responsibility within the first orderable region to a server, wherein the ordering responsibility includes a first rule for order of operations between the two request messages; and
    attach, when the two operations are non-overlapping operations, an acquire flag to a first request message of the two request messages or a release flag to a second request message of the two request messages, wherein the acquire flag and the release flag provide a second rule for the order of operations between the two request messages.

10. The integrated circuit of claim 9, wherein the first rule includes ordering the order of operations included in the two request messages by ordering a read operation before a write operation when the server accepts the read operation and the write operation on a same cycle.

11. The integrated circuit of claim 10, wherein the second rule includes, when the acquire flag or the release flag is attached, ordering the order of operations between the two request messages by ordering an operation of the read operation and the write operation based on an accepted sequence by the server.

12. The integrated circuit of claim 9, wherein the interconnect is further configured to:
    order the order of operations between the two request messages according to the first rule and the second rule.

13. The integrated circuit of claim 9, wherein the two operations are two first operations, the multiple regions further comprise:
a second orderable region, wherein:
a third request message for access to memory-mapped sources and a fourth request message for access to memory-mapped sources including two respective second operations are transmitted over the second orderable region;
the third request message and the fourth request messages originate from a second logical client; and
the two respective second operations of the third request message and the fourth request message are overlapping operations; and
a third unordered region, wherein a third logical client enforces an order between operations included in request messages for access to memory-mapped sources within the third unordered region.

14. A non-transitory computer readable medium comprising a circuit representation that, when processed by a computer, is used to program or manufacture an integrated circuit comprising:
an interconnect configured to:
partition addressable regions of one or more logical servers on or within the interconnect link into multiple regions including at least a first orderable region, wherein:
two request messages for access to memory-mapped sources including two respective operations are transmitted over the first orderable region; and
the two request messages originate from a logical client;
provide the logical client an ability to push ordering responsibility within the first orderable region to a server, wherein the ordering responsibility includes a first rule for order of operations between the two request messages; and
attach, when the two operations are non-overlapping operations, an acquire flag to a first request message of the two request messages or a release flag to a second request message of the two request messages, wherein the acquire flag and the release flag provide a second rule for the order of operations between the two request messages.

15. The non-transitory computer readable medium of claim 14, comprising the circuit representation that, when processed by the computer, is used to program or manufacture the integrated circuit, wherein the first rule includes ordering the order of operations included in the two request messages by ordering a read operation before a write operation when the server accepts the read operation and the write operation on a same cycle.

16. The non-transitory computer readable medium of claim 15, comprising the circuit representation that, when processed by the computer, is used to program or manufacture the integrated circuit, wherein the second rule includes, when the acquire flag or the release flag is attached, ordering the order of operations between the two request messages by ordering an operation of the read operation and the write operation based on an accepted sequence by the server.

17. The non-transitory computer readable medium of claim 14, comprising the circuit representation that, when processed by the computer, is used to program or manufacture the integrated circuit, wherein the interconnect of the integrated circuit is further to:
order the order of operations between the two request messages according to the first rule and the second rule.

18. The non-transitory computer readable medium of claim 14, comprising the circuit representation that, when processed by the computer, is used to program or manufacture the integrated circuit, wherein the two operations are two first operations, and the multiple regions further comprises:
a second orderable region, wherein:
a third request message for access to memory-mapped sources and a fourth request message for access to memory-mapped sources including two respective second operations are transmitted over the second orderable region;
the third request message and the fourth request messages originate from a second logical client; and
the two respective operations of the third request message and the fourth request message are overlapping operations; and
a third unordered region, wherein:
a third logical client enforces an order between operations included in request messages for access to memory-mapped sources within the third unordered region.

19. The non-transitory computer readable medium of claim 18, comprising the circuit representation that, when processed by the computer, is used to program or manufacture the integrated circuit, wherein the interconnect of the integrated circuit is further to:
provide the second logical client an ability to push the ordering responsibility within the second orderable region to the server, wherein the ordering responsibility includes the first rule for order of operations between the third request message and the fourth request message.

20. The non-transitory computer readable medium of claim 19, comprising the circuit representation that, when processed by the computer, is used to program or manufacture the integrated circuit, wherein the multiple regions further comprise a third unordered region, wherein a third logical client enforces an order between operations included in request messages for access to memory-mapped sources within the third unordered region, and the interconnect of the integrated circuit is further to:
provide an assertion error when the server receives a request message with the acquire flag or the release flag from the second orderable region or the third unordered region.

* * * * *